US006931940B2

(12) United States Patent  
Baudendistel

(10) Patent No.: US 6,931,940 B2
(45) Date of Patent: Aug. 23, 2005

(54) MAGNETOSTRICTIVE STRAIN SENSOR WITH HALL EFFECT

(75) Inventor: Thomas A. Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/263,409

(22) Filed: Oct. 2, 2002

(65) Prior Publication Data

US 2004/0065156 A1 Apr. 8, 2004

(51) Int. Cl.[7] ............................. G01B 7/16; G01L 1/00
(52) U.S. Cl. ............................................. 73/779
(58) Field of Search ..................... 73/862.333, 862.335, 73/862, 336, 779, 799, 862.69, 862.331; 335/215; 324/207.12, 207.2

(56) References Cited

U.S. PATENT DOCUMENTS

| | | | | |
|---|---|---|---|---|
| 4,882,936 A | * | 11/1989 | Garshelis et al. | ........ 73/862.36 |
| 5,339,699 A | * | 8/1994 | Carignan | ................. 73/862.69 |
| 5,490,431 A | * | 2/1996 | O'Mahony et al. | ..... 73/862.331 |
| 5,703,553 A | * | 12/1997 | Bushko et al. | ............... 335/215 |
| 5,823,627 A | | 10/1998 | Viano et al. | |
| 6,036,838 A | * | 3/2000 | Wieser et al. | ................ 205/339 |
| 6,060,880 A | * | 5/2000 | Guyot et al. | .............. 324/207.2 |
| 6,222,359 B1 | * | 4/2001 | Duesler et al. | ......... 324/207.12 |
| 6,360,618 B2 | | 3/2002 | Anahid et al. | |
| 6,433,538 B1 | * | 8/2002 | Reichl et al. | ........... 324/207.25 |
| 6,490,934 B2 | * | 12/2002 | Garshelis | ................ 73/862.336 |

* cited by examiner

Primary Examiner—Max Noori
Assistant Examiner—Octavia Davis
(74) Attorney, Agent, or Firm—Michael D. Smith

(57) ABSTRACT

A magnetostrictive strain sensor includes a Hall effect sensor for measuring the change in magnetic flux a magnetic circuit including a magnetostrictive element. A strain sensing apparatus includes one or more magnetic elements defining a magnetic circuit having a gap, and including a magnetostrictive element adapted to receive a load force. A Hall effect sensor is disposed within the gap for sensing a change in magnetic flux in the magnetic circuit. The Hall effect sensor may include a programmable circuit for zeroing and calibrating the sensing apparatus, and for providing temperature compensation. The magnetostrictive element may be magnetized to form the magnetized element, and may be formed from material known as TERFENOL-D.

17 Claims, 3 Drawing Sheets

MAGNETOSTRICTIVE STRAIN SENSOR WITH HALL EFFECT

"This invention was made in the performance of a Cooperative Research and Development Agreement with the Department of the Air Force. The Government of the United States has certain rights to use the invention."

TECHNICAL FIELD OF THE INVENTION

This invention relates to strain sensors, and more particularly to an apparatus and method for measuring strain with a sensor having a magnetostrictive element.

BACKGROUND OF THE INVENTION

It is often necessary when testing materials or operating a device to measure or monitor a material property known as "strain." Both tensile and compressive strain may be of interest, depending upon the material and the operating conditions to which the material will be subjected. Strain is defined as the differential elongation of a body under load divided by the length of the body when it is not being loaded.

The differential elongation of many bodies is very small, on the order of a few thousandths or ten-thousandths of an inch, making direct measurement of the strain difficult. It is common practice to affix or attach a strain sensor to a body to measure strain in the body.

One type of strain sensor, known as a magnetostrictive strain sensor, includes magnetic elements that form a magnetic flux path, and a magnetized element for establishing a magnetic flux field within the magnetic flux path. One of the magnetic elements of the sensor, hereinafter referred to as the magnetostrictive element, is affixed to the body in such a manner that as the body elongates or is compressed under load, the magnetostrictive element is also elongated or compressed an equal distance. As the length of the magnetostrictive element is changed, its magnetic permeability is also changed, which in turn causes a change in the magnetic field in the flux path. By sensing the change in the magnetic flux, the strain in the magnetostrictive element and the body to which it is affixed can be determined.

The change in magnetic flux is often detected by measuring the change in electric current flow, induced by the magnetic flux within the sensor flux path, in a coil of wire wrapped externally around a portion of the magnetic flux path. The change in current flow is measured and compared to a calibration table to determine the strain in the body.

Although many magnetic materials, including steel and Nickel, can be utilized as the magnetostrictive element in a strain sensor, certain materials exhibit greater changes in magnetic permeability when subjected to a load, i.e. stronger magnetostrictive performance, than other materials. One material offering particular advantages when used as the working element in magnetostrictive strain sensors is known as TERFENOL-D. TERFENOL-D is an alloy of terbium, iron, and Dysprosium-D, developed by the United States Navy, and sold under the trade name TERFENOL-D® by ETREMA Products, INC., of Ames, Iowa, U.S. The change in magnetic permeability of TERFENOL-D under load is thousands of times greater than steel, and is thus more readily detectable. TERFENOL-D is also hundreds of times stronger than Nickel, allowing a more robust sensing device to be provided.

While magnetostrictive strain sensors of the type described above are acceptable for many applications, they do have some undesirable drawbacks. The external coils in such sensors cause the sensor to be bulky, and may not allow the sensor to fit into the space available for the strain sensor in some applications. Calibration of the sensor can also be difficult.

What is needed, therefore, is an improved magnetostrictive strain sensor.

SUMMARY OF THE INVENTION

My invention provides an improved magnetostrictive strain sensor by using a Hall effect sensor for measuring a change in magnetic flux in a magnetic circuit including a magnetostrictive element, as the body to which the sensor is attached is subjected to a load.

In one form of my invention, a strain sensing apparatus includes one or more magnetic elements defining a magnetic circuit having a gap, and including a magnetostrictive element adapted to receive a load force. A Hall effect sensor is disposed within the gap for sensing a change in magnetic flux in the magnetic circuit. The Hall effect sensor may include a programmable circuit for zeroing and calibrating the sensing apparatus, and for providing temperature compensation. The magnetostrictive element may be magnetized to form the magnetized element, and may be formed from TERFENOL-D.

The magnetostrictive element may define a longitudinal axis and first and second axial ends thereof, and the magnetic circuit may include a pair of magnetic elements abutting the magnetostrictive element, with one element of the pair abutting the first axial end of the magnetostrictive element and the other element of the pair abutting the second axial end of the magnetostrictive element. The magnetic elements of the pair are spaced from one another along the longitudinal axis of the magnetostrictive element to form the gap in the magnetic circuit.

My invention may also take the form of a method for measuring strain in a body, by affixing to the body a magnetic circuit having one or more magnetic elements including a magnetostrictive element and defining a gap, and measuring a change in magnetic flux in the magnetic circuit with a Hall effect sensor disposed within the gap, while the body is subjected to a load causing strain in the body.

The foregoing and other features and advantages of our invention are apparent from the following detailed description of exemplary embodiments, read in conjunction with the accompanying drawing. The detailed description and drawing are merely illustrative of the invention rather than limiting, the scope of the invention being defined by the appended claims and equivalents thereof.

DETAILED DESCRIPTION

Figure 1:
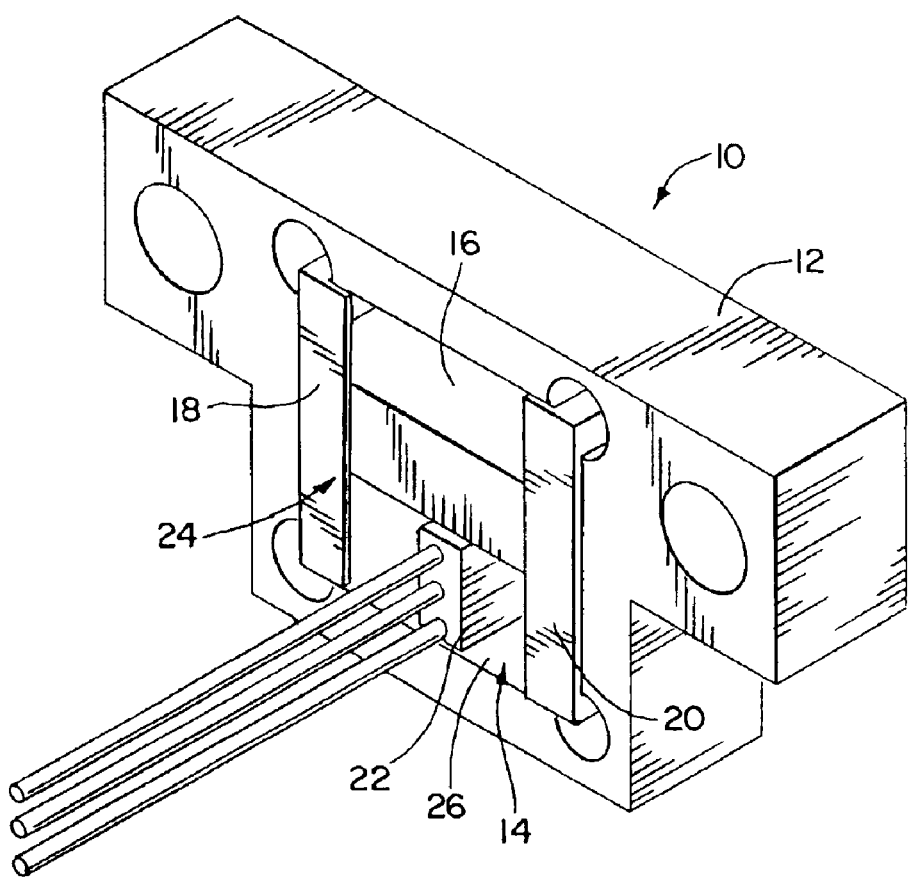
FIG. 1 is a perspective view of a strain sensor, according to my invention.
Figure 2:
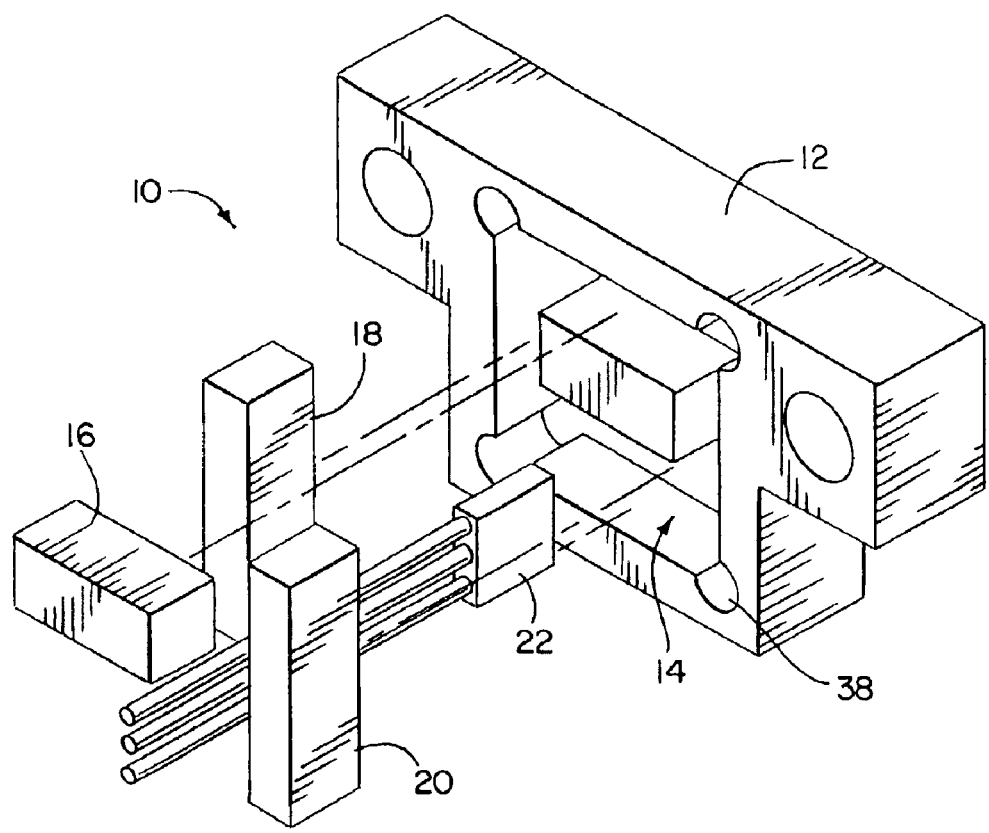
FIG. 2 is an exploded perspective view of the strain sensor of FIG. 1.
Figure 3:
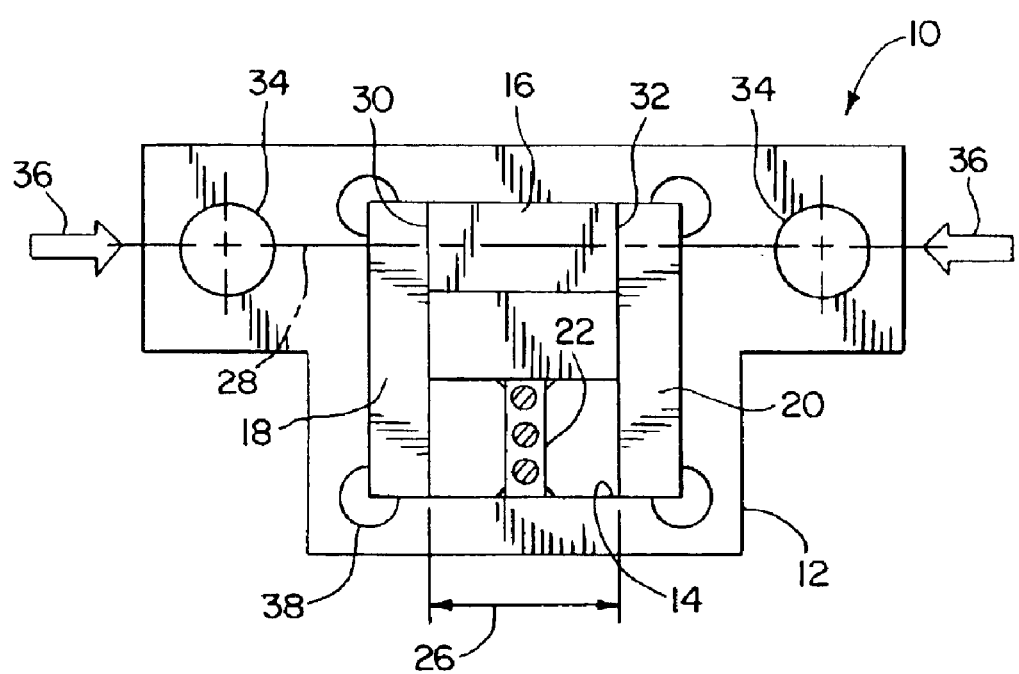
FIG. 3 is an orthographic view of the sensor of FIGS. 1 and 2.

FIGS. 1–3 illustrates an exemplary embodiment of a magnetostrictive sensing apparatus, in the form of a strain sensor 10, according to my invention. The strain sensor 10 includes a housing 12 having a groove 14 therein, for receipt of a working magnetic element, in the form of a magnetostrictive element 16, a pair of additional magnetic elements 18, 20, and a Hall effect sensor 22. The housing 12 is preferably formed from a non-magnetic material, such as aluminum, non-magnetic stainless steel, ceramic, plastic, or composites. The magnetic elements 16, 18, 20 define a magnetic circuit 24 having a gap 26. The Hall effect sensor 22 is disposed within the gap 26 for sensing a change in magnetic flux in the magnetic circuit 24. It is preferable that the Hall effect sensor 22, include a programmable circuit for performing such functions as zeroing and calibrating the sensing apparatus, and providing temperature compensation The magnetostrictive element 16 in the exemplary embodiment is preferably formed of a highly magnetostrictive material, such as TERFENOL-D, but any magnetic material exhibiting magnetostrictive performance, such as Nickel or steel, could also be used. In the exemplary embodiment the magnetostrictive element 16 is preferably magnetized, to induce a magnetic flux in the magnetic circuit 24. Alternatively, one or both of the pair of additional magnetic elements 18, 20 could be magnetized to induce the flux in the magnetic circuit 24.

As shown in FIG. 2, The magnetostrictive element 16, and the pair of additional magnetic elements 18, 20 in the exemplary embodiment, are generally rectangular-shaped parallelepipeds. Other shapes, such as J or C shapes may be used for the pair of additional elements 18, 20, and cross sections other than rectangular may also be used for forming the magnetic circuit 24, in other embodiments of my invention. The groove 14 in the housing 12 is generally rectangular in both cross section and profile, to accommodate the rectangular magnetic elements 16, 18, 20, and includes stress relief cuts 38 at the external corners of the groove 14.

As shown in FIG. 3, the magnetostrictive element 16 defines a longitudinal axis 28 and first and second axial ends 30, 32 of the magnetostrictive element 16. The remainder of the magnetic circuit 24 is formed by the pair of magnetic elements 18, 20 abutting the magnetostrictive element 16, with one element 18 of the pair abutting the first axial end 30 of the magnetostrictive element 16 and the other element 20 of the pair abutting the second axial end 32 of the magnetostrictive element 16. The pair of magnetic elements 18, 20 are spaced from one another along the longitudinal axis 28 of the magnetostrictive element 16, to form the gap 26.

In the exemplary embodiment, the length of the magnetostrictive element 16 sets the width of the gap 26. In other embodiments, J or C shaped elements 18, 20 can be used to set gap widths that are different from the length of the magnetostrictive element 16. In designing a sensor 10, according to my invention, I contemplate that the width of the air gap 26 will be selected so that the Hall effect sensor 22 will not be saturated. The width of the air gap 26 may be balanced with the degree to which the magnetic elements 16, 18, 20 are magnetized, to achieve a non-saturated operating condition for the Hall effect sensor 22.

The magnetic elements 16, 18, 20, and the Hall effect sensor may be affixed to the housing 12 by a variety of methods. In the exemplary embodiment, the magnetostrictive element 16 and the pair of additional magnetic elements 18, 20 are configured to have an interference fit within the groove 14 of the housing 12. Traditional press fitting or shrink fitting methods may be used for inserting the magnetostrictive element 16 and the pair of additional magnetic elements 18, 20 into the housing. In the exemplary embodiment, the Hall effect sensor 22 is adhesively bonded into the gap 26, but many other methods of attachment, such as mounting screws or a light press fit into the housing, could also be used.

The longitudinal axis 28 of the magnetostrictive element 16 also defines a strain axis of the sensor 10. The housing 12 includes a pair of mounting holes 34 disposed along the strain axis 28 of the sensor 10, with one hole 34 of the pair adjacent the first axial end 30 of the magnetostrictive element 16, and the other hole 34 of the pair adjacent the second axial end 32 of the magnetostrictive element 16.

The holes 34 provide a method of attaching the sensor 10 to a body in which it is desired to know the strain along a strain axis of the body. By having the holes 34 aligned along the strain axis 28 of the sensor 10, the housing 12 can be aligned along a strain axis in the body, between a pair of sensor mounting bolts or pins adapted for attaching the sensor 10 to the body. Where mounting bolts are utilized, friction between faying surfaces of the housing 12 and the body will further aid in transferring strain in the body, caused by application of a load, as shown by arrows 36 in FIG. 3.

The sensor 10 may also be attached to the body in other ways, such as by bonding the sensor 10 to the body with an adhesive, or by embedding the magnetic circuit 24 and Hall effect sensor 22, or the entire sensor 10, directly into the body.

While the embodiments of my invention disclosed herein are presently considered to be preferred, various changes and modifications can be made without departing from the spirit and scope of the invention. For example, although the exemplary embodiment described above has been described for measuring a compressive strain, a sensor 10 according to my invention can be configured for measuring tensile strain by installing the magnetostrictive element 16 into the housing 12 with a compressive pre-load acting on the axial ends 30, 32 of the magnetostrictive element 16. The various elements and aspects of my invention may also be used independently from one another, or in different combinations than are described above and in the drawing with regard to the exemplary embodiment.

The scope of the invention is indicated in the appended claims. I intend that all changes or modifications within the meaning and range of equivalents are embraced by the claims.

I claim:

1. A strain sensing apparatus comprising:
   a pair of permanently magnetized elements defining a gap and inducing a magnetic flux within the gap;
   a magnetostrictive element having a longitudinal axis disposed within the gap, said magnetostrictive element comprising a first axial end adjacent one magnetized element and a second axial end adjacent the other magnetized element, said magnetostrictive element being adapted to receive a load force and effective to alter the magnetic flux within the gap in response to said load force; and
   a Hall effect sensor disposed within the gap for sensing a change in the magnetic flux.

2. The sensing apparatus of claim 1 wherein the Hall effect sensor includes a programmable circuit for zeroing and calibrating the sensing apparatus, and for providing temperature compensation.

3. The sensing apparatus of claim 1 wherein the magnetostrictive element is formed for TERFENOL-D.

4. The sensing apparatus of claim 1 wherein the magnetized elements abut the magnetostrictive element.

5. The sensing apparatus of claim 4 wherein:
   said one magnetized element abuts the first axial end of the magnetostrictive element and the other magnetized element abuts the second axial end of the magnetostrictive element.

6. The sensing apparatus of claim 1 further comprising a housing having a groove therein for receipt of the magnetized elements, the magnetostrictive element and the Hall effect sensor.

7. The sensing apparatus of claim 6 wherein the magnetostrictive element and the groove in the housing are adapted to provide an interference fit between the magnetostrictive element and the housing.

8. The sensing apparatus of claim 6 wherein the housing defines a strain axis of the sensor, and a portion of the groove in the housing is adapted to position the magnetostrictive element along the strain axis of the sensor.

9. The sensing apparatus of claim 8 wherein the housing is adapted for affixation to a body in which it is desired to measure a strain in the body along a strain axis of the body.

10. The sensing apparatus of claim 9 wherein the housing is adapted for aligning the strain axis of the sensor with the strain axis of the body.

11. The sensing apparatus of claim 10 wherein:

the magnetostrictive element defines a longitudinal axis and first and second axial ends thereof;

the housing includes a pair of mounting holes disposed along the strain axis of the sensor, with one hole of the pair adjacent the first axial end of the magnetostrictive element and the other hole of the pair adjacent the second axial end of the magnetostrictive element.

12. A strain sensor for sensing a strain in a body the sensor comprising:

a housing adapted for affixation to the body and defining a longitudinal axis parallel a strain axis in the body, said housing comprising a groove;

a pair of magnetized elements affixed to the housing spaced apart by a gap and inducing a magnetic flux within the gap;

a magnetostrictive element disposed within the gap and having a first end and a second end spaced apart along the longitudinal axis, said magnetostrictive element and said pair of magnetostrictive elements being arranged within the gap such that the first end of the magnetostrictive element abuts one said magnetized element and the second end of the magnetostrictive element abuts the other magnetostrictive element, said magnetostrictive element being adapted to receive a load force and to alter the magnetic flux within the gap in response to said load force; and a Hall effect sensor disposed within the gap for sensing a change in the magnetic flux.

13. The sensor of claim 12 wherein the Hall effect sensor includes a programmable circuit for zeroing and calibrating the sensing apparatus, and for providing temperature compensation.

14. The sensing apparatus of claim 12 wherein the magnetostrictive element is formed from TERFENOL-D.

15. The sensor of claim 12 wherein magnetized elements, the magnetostrictive element and the groove in the housing are adapted to provide an interference fit between the magnetostrictive element and the housing.

16. The sensor of claim 12 wherein:

the housing includes a pair of mounting holes disposed along the longitudinal axis, with one hole of the pair adjacent the first axial end of the magnetostrictive element and the other hole of the pair adjacent the second axial end of the magnetostrictive element.

17. A method for measuring strain in a body, the method comprising:

affixing to the body a sensing apparatus that includes a pair of magnetized elements defining a gap and inducing a magnetic flux within the gap;

disposing a magnetostrictive element within the gap, said magnetostrictive element comprising a first end abutting one said magnetized element and a second end abutting the other said magnetized element;

applying a load force to the magnetostrictive element, said load force resulting from strain within the body, whereby magnetostrictive element alters the magnetic flux within the gap; and measuring a change in magnetic flux within the gap with a Hall effect sensor disposed within the gap, while the body is subjected to the strain.

* * * * *